US012662941B2

(12) United States Patent
Hunter

(10) Patent No.: US 12,662,941 B2

(45) Date of Patent: Jun. 23, 2026

(54) RADIAL CAM ENGINE

(71) Applicant: Duane Hunter, Garbutt (AU)

(72) Inventor: Duane Hunter, Garbutt (AU)

( * ) Notice: Subject to any disclaimer, the term of this patent is extended or adjusted under 35 U.S.C. 154(b) by 0 days.

(21) Appl. No.: 18/871,796

(22) PCT Filed: Jun. 14, 2023

(86) PCT No.: PCT/AU2023/050523
§ 371 (c)(1),
(2) Date: Dec. 4, 2024

(87) PCT Pub. No.: WO2023/240310
PCT Pub. Date: Dec. 21, 2023

(65) Prior Publication Data

US 2025/0320819 A1 Oct. 16, 2025

(30) Foreign Application Priority Data

Jun. 16, 2022 (AU) ................................ 2022901640

(51) Int. Cl.
*F02B 75/22* (2006.01)
*F01B 1/06* (2006.01)
(Continued)

(52) U.S. Cl.
CPC .............. *F01B 1/0624* (2013.01); *F01B 9/06* (2013.01); *F02B 75/222* (2013.01); *F02D 19/06* (2013.01);
(Continued)

(58) Field of Classification Search
CPC .................. F01B 9/06; F01B 2009/065; F01B 2009/061; F01B 2009/068; F01B 1/0624;
(Continued)

(56) References Cited

U.S. PATENT DOCUMENTS 1,829,780 A 11/1931 Beytes et al.
1,863,877 A 6/1932 Rightenour
(Continued)

FOREIGN PATENT DOCUMENTS

DE 1800597 A1 5/1970
DE 102010037970 A1 4/2012

OTHER PUBLICATIONS

International Preliminary Report on Patentability (Chapter II) dated Apr. 23, 2024 from PCT Application No. PCT/AU2023/050523, 6 pages.

(Continued)

*Primary Examiner* — Hung Q Nguyen
*Assistant Examiner* — James J Kim
(74) *Attorney, Agent, or Firm* — INNOVATION CAPITAL LAW GROUP, LLP; Vic Lin

(57) ABSTRACT

The radial cam engine described consists of a piston assembly arranged in a radial configuration. Within the engine, a piston moves back and forth within a cylinder during the internal combustion process. The piston is connected to a follower that is guided and interacts with a central cam. This central cam is responsible for turning a drive shaft. The radial cam incorporates three different cam profiles, each designed for a specific stage of the engine's operation. These profiles are specifically tailored for the compression stroke, combustion stroke, and exhaust stroke. By utilizing distinct cam profiles for each stroke, the engine can optimize its performance throughout the entire combustion process.

16 Claims, 4 Drawing Sheets

(51) Int. Cl.
*F01B 9/06* (2006.01)
*F02D 19/06* (2006.01)
*F02D 19/08* (2006.01)

(52) U.S. Cl.
CPC ........ *F02D 19/08* (2013.01); *F01B 2009/061* (2013.01)

(58) Field of Classification Search
CPC .............. F01B 2009/066; F01B 13/061; F01B 1/062; F01B 1/0648; F02B 75/222; F02B 75/32; F02B 75/22
USPC .......................................................... 123/54.3
See application file for complete search history.

(56) References Cited

U.S. PATENT DOCUMENTS

| | | | | |
|---|---|---|---|---|
| 2,120,657 A | | 6/1938 | Tucker | |
| 3,572,209 A | | 3/1971 | Aldridge et al. | |
| 3,945,358 A | | 3/1976 | Collins | |
| 4,170,166 A | * | 10/1979 | Reed | F01B 19/00 92/38 |
| 10,598,090 B2 | * | 3/2020 | O'Neill | F01B 9/06 |
| 2014/0318483 A1 | * | 10/2014 | Shutlar | F01B 1/062 123/55.3 |
| 2014/0360446 A1 | * | 12/2014 | Nguyen | B60K 6/42 123/54.3 |
| 2016/0017795 A1 | * | 1/2016 | Crover | F01B 1/0634 123/197.4 |
| 2016/0333693 A1 | * | 11/2016 | Bowen | F01B 9/06 |
| 2017/0122226 A1 | * | 5/2017 | Lutz | F02D 41/402 |
| 2017/0328277 A1 | * | 11/2017 | Ardezzone | F01B 1/12 |

OTHER PUBLICATIONS

International Search Report & Written Opinion dated Jul. 13, 2023 from PCT Application No. PCT/AU2023/050523, 11 pages.

* cited by examiner

RADIAL CAM ENGINE

FIELD OF THE INVENTION

This invention relates generally to a type of a radial cam engine.

SUMMARY OF THE DISCLOSURE

The radial cam engine described consists of a piston assembly arranged in a radial configuration.

Within the engine, a piston moves back and forth within a cylinder during the internal combustion process.

The piston is connected to a follower that is guided and interacts with a central cam. This central cam is responsible for turning a drive shaft.

The radial cam incorporates three different cam profiles, each designed for a specific stage of the engine's operation.

These profiles are specifically tailored for the compression stroke, combustion stroke, and exhaust stroke.

By utilising distinct cam profiles for each stroke, the engine can optimize its performance throughout the entire combustion process.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
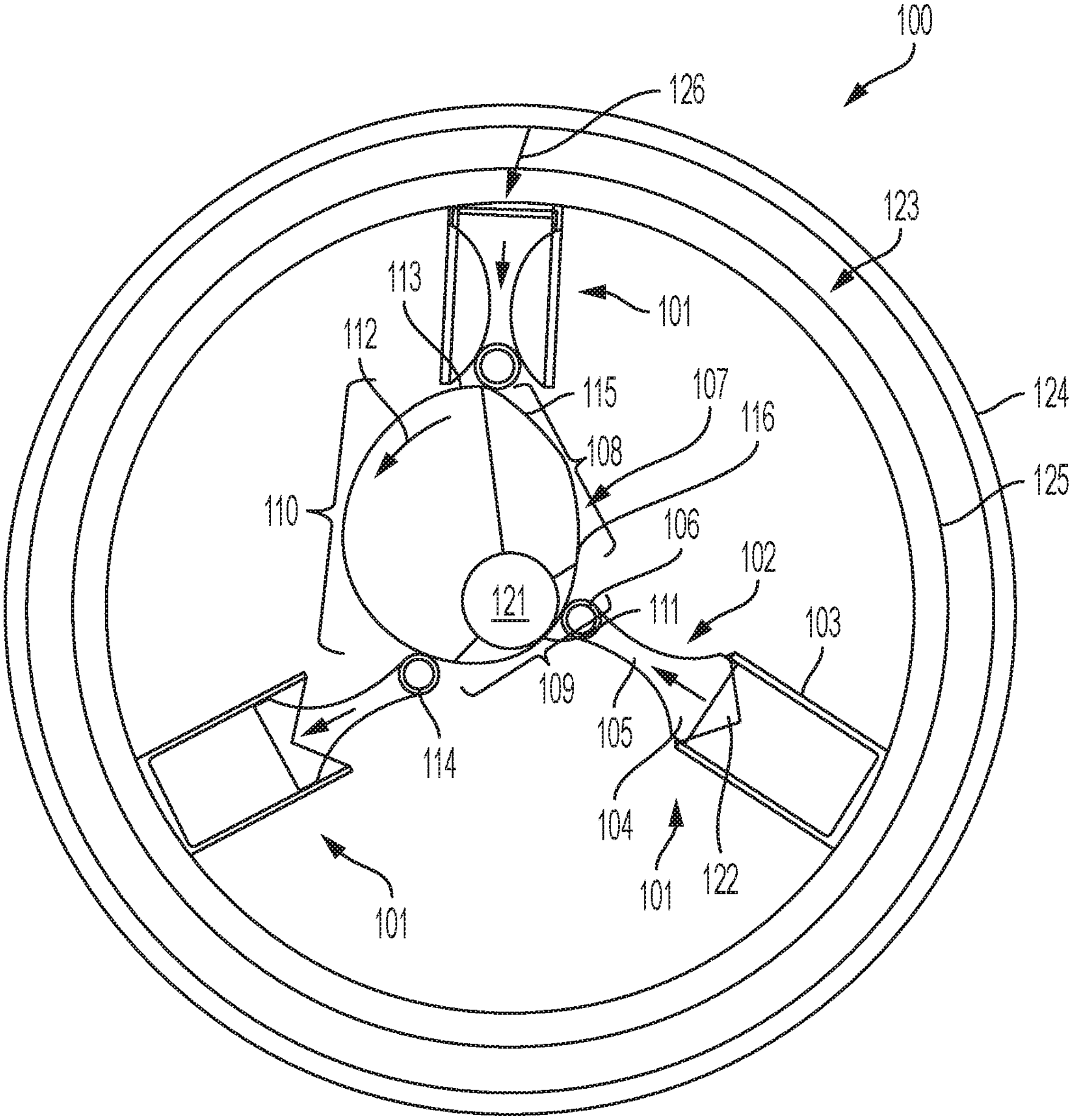
FIG. 1 shows a side cross-sectional view of a radial cam engine in accordance with an embodiment.

A radial cam engine 100 comprises at least one radially arranged piston assembly 101. In the embodiment shown, the engine 100 comprises three piston assemblies 101, however the number may be varied in embodiments.

Each piston assembly 101 comprises a piston 102 reciprocating within an internal combustion cylinder 103. The piston 102 may comprise a piston head 104 fitting within the cylinder 103 and a stem 105. A distal end of the stem may define a guided follower 106.

The guided follower 106 operably interfaces a central cam 107. The cam 107 rotates in the direction shown by the directional indicator 112.

The cam 107 comprises three distinct cam profiles comprising a combustion cam profile 108, exhaust cam profile 109 and compression cam profile 110.

The angle of the combustion cam profile 108 to be approximately half that of the compression cam profile 110. Furthermore, the angle of the exhaust cam profile 109 may be greater than the compression cam profile 110.

In the embodiment shown, the combustion cam profile 108 may be between 50 and 80°, approximately 64.5° in the embodiment shown.

Furthermore, the compression cam profile 110 may be between 110 and 150°, approximately 130° in the embodiment shown.

Furthermore, the angle of the exhaust cam profile 109 may be between 150 and 180°, approximately 165° in the embodiment shown.

The cam 107 may have a minimum radius at the exhaust cam profile 109. Furthermore, the minimum radius of the exhaust cam profile may be at a midway point 111 of the exhaust cam profile 109.

The cam 107 may have a largest radius between the compression cam profile 110 and the combustion cam profile 108.

The radius of the compression cam profile 110 increases with angle. Specifically, the maximum radius of the compression cam profile 110 may be at an end 113 of the compression cam profile 110. Similarly, the minimum radius of the compression cam profile 110 may be at a start 114 of the compression cam profile 110.

The radius of the compression cam profile 110 may increase linearly with angle.

The combustion cam profile 108 may have a start 115 shaped to impart a greater tangential force vector component orthogonal to a radius of the cam 107 as compared to at an end 116 thereof. In other words, during internal combustion, the follower 106 imparts a greater tangential force vector component at the start 115 of the combustion cam profile 108, thereby maximising rotational force on the cam 107 at the start 115 of the combustion cam profile 108. The tangential force vector component may gradually decrease towards the end 116 of the combustion cam profile 108.

Each follower 106 may comprise a roller bearing interfacing the cam 107.

Figure 3:
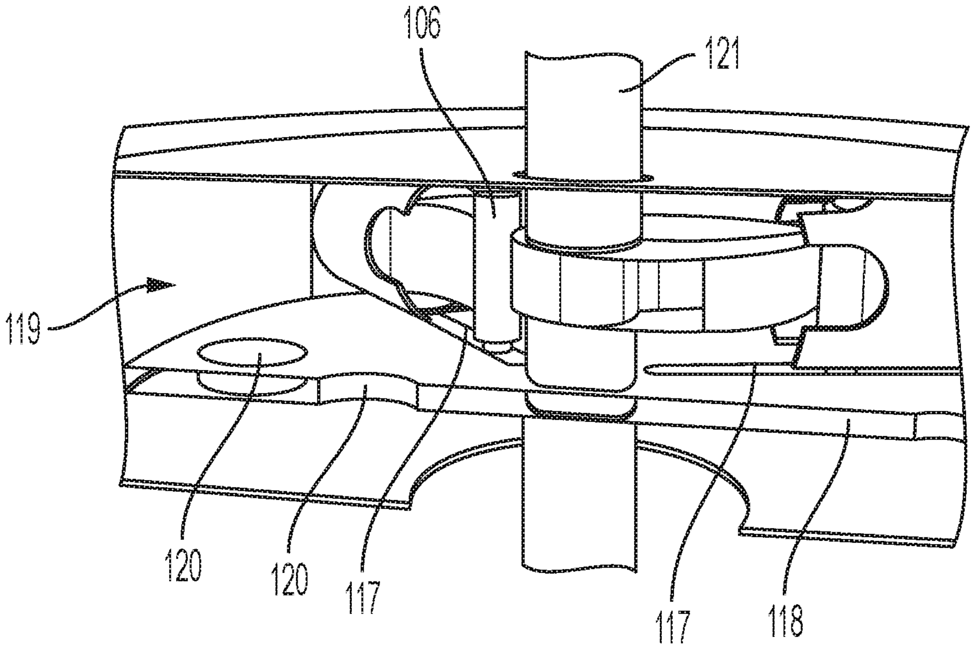
FIG. 3 shows a perspective cut away view of the cam engine in accordance with an embodiment.

As shown in FIG. 3, the follower 106 may be guided linearly within guide rails 117. The guide rails 117 may be formed within a central plate 118. The central plate 119 may enclose part of an exhaust chamber 119 and the central plate 118 may have exhaust apertures 120 therethrough. In a preferred embodiment, guide rails 117 are formed either side of each follower 116. In other words, whereas FIG. 3 only shows guide rails to one side of the follower, in embodiments, guide rails 117 would be provided on both sides of the follower 116 also. In this regard, guide rails 117 may be provided by an adjacent side plate or the like so that the follower 106 is evenly guided either side thereof by the guide rails 117.

During the exhaust stroke, the head 104 of the piston 102 may move beyond a side exhaust port 122 of the cylinder 103, thereby allowing gaseous exhaust into the exhaust chamber 119.

The exhaust ports 122 may be designed to define an opening proportionate to piston offset. For example, in the embodiment shown in FIG. 1, the side exhaust ports 112 have a generally triangular cross-section. However, in the embodiment shown in FIG. 2, the side exhaust ports 112 have a generally semi-circular cross-section.

The piston assembly 101 be poised at an angle with respect to a radius from the driveshaft 121. In the embodiment shown, the piston assembly 101 is at an angle of approximately 3° in the direction of rotation.

The engine 100 may further comprise an intake manifold 123 interfacing the cylinders 103. In embodiments, the manifold 123 is turbo injected with compressed air. The manifold 123 may be defined between an outer cylindrical section and an inner cylindrical section 125.

A valve may interface the cylinder 103 and the manifold 123. The valve may be configured to close under compression during the compression stroke and, in this regard, may take the form of a reed valve. However, when not under compression, the valve may open, thereby allowing pressurised air from the manifold 123 to clear the cylinder 103.

The engine 100 may further comprise a fuel injector 126 which injects fuel into the cylinder 103. The fuel injector 126 may be timed to inject fuel near the top dead centre position of the piston 102, such as when the follower 106 is between the compression cam profile 110 and the combustion cam profile 108. The timing of the fuel injector may operably coupled to depend on the rotary position of the cam 107.

Figure 4:
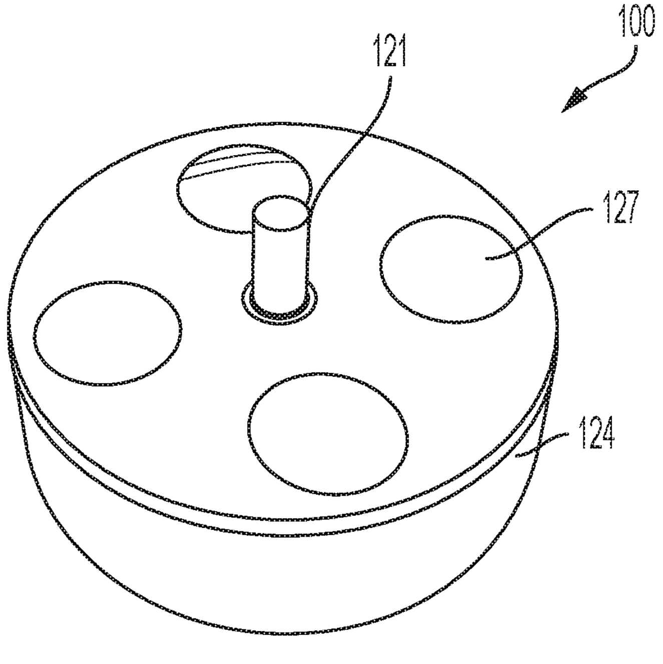
FIG. 4 shows an exterior view of the cam engine in accordance with an embodiment.

With reference to FIG. 4, the engine 100 may be encased within a substantially cylindrical housing. The housing may comprise an air intakes 127 leading to the manifold 123.

The engine 100 may be run on diesel, petrol, vegetable oil, biofuels or hydrogen.

At the start 114 of the compression cam profile, the piston 102 goes into the cylinder 103, thereby creating compression. As alluded to above, the cylinder valve may close to seal the cylinder 103, either under pressure or by timing mechanism coupled to the rotary position of the cam 107.

Near the top dead centre position of the piston 102 (that is between the compression cam profile 110 and the combustion cam profile 108), fuel may be injected by the fuel injector 126 into the cylinder 103. Preferably no spark plug is required wherein the air fuel mixture ignites under compression.

Ignition is timed just when the follower 106 of the piston 102 is at the start 115 of the combustion cam profile 108. As alluded to above, the shape of the start 115 of the combustion cam profile 108 imparts a greater tangential force vector component, thereby increasing the rotational force imparted on the cam 107.

The piston 102 moves out from the cylinder 103 whilst imparting rotary force on the combustion cam profile 108.

As the follower 106 moves into the exhaust cam profile 109, the piston head 104 moves beyond the side exhaust port 122, thereby allowing the escape of spent gases into the exhaust chamber 119 of the engine 100. Compressed air within the manifold 123 may flush the cylinder 103 with fresh air for the next compression and combustion strokes.

In embodiments, the engine 100 operates on a dual fuel mixture. The dual fuel mixture may comprise a mixture of petrol and diesel. In this regard, the engine 100 may comprise dual fuel injectors 126 for each cylinder 103.

In embodiments, these dual fuel injectors 126 may be timed differently wherein, for example, the petrol fuel injector 126 injects petrol at the start of the compression stroke whereas the diesel fuel injector 126 injects diesel later towards the end of the compression stroke. The compression of the diesel fuel may cause the diesel fuel to ignite, thereby simultaneously igniting the petrol air mixture.

In embodiments, the piston assemblies 101 are electromagnetic. In this regard, the outer end of each cylinder 103 may comprise an electromagnet controlled by electronic timing circuitry to repulse the head 104 of the piston 102. The head of the piston 102 may comprise a permanent magnet therein to increase the magnetic force applied by the electromagnet.

In embodiments, the electromagnets may be controlled on or off. However, in a preferred embodiment, the current applied to the electromagnets may be controlled to control the force applied on the piston 102 proportionately depending on the rotational position of the cam 107. As such, for example, greatest current may be applied at the start of the 'combustion' cam profile 108 which gradually decreases towards the end thereof.

This arrangement of electromagnetic pistons may overcome counter-electromotive force/back EMF experienced by conventional electric motors.

Figure 5:
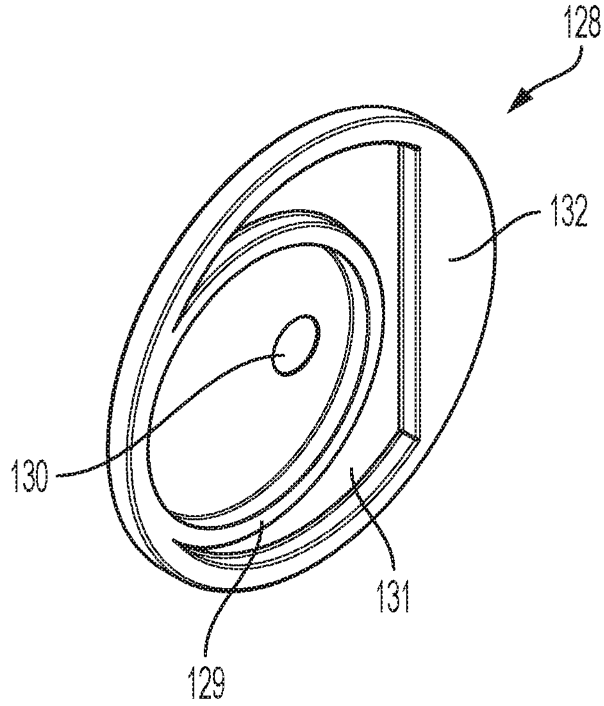
FIG. 5 shows a flywheel with an eccentric guide in accordance an embodiment.
Figure 6:
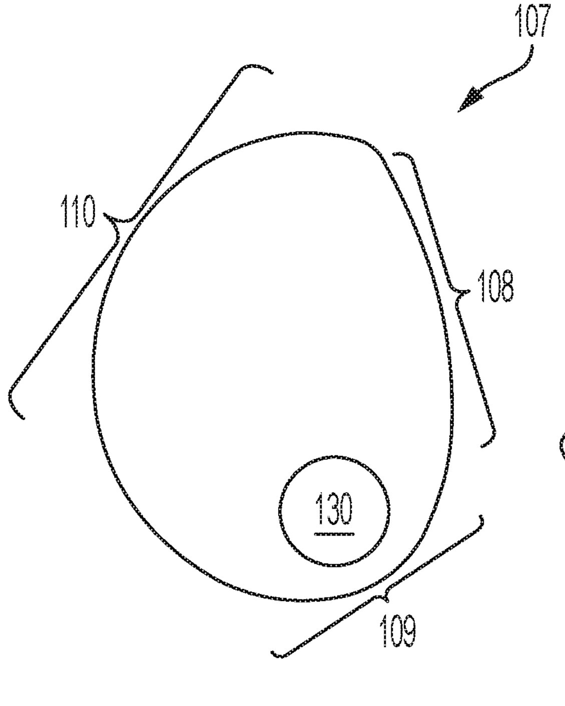
FIG. 6 shows a side view of the cam in accordance with an embodiment.

FIG. 5 shows an embodiment wherein the engine 100 comprises a flywheel 128 having a central aperture 130 for the driveshaft 121 so that the flywheel 128 rotates with the driveshaft 121.

The flywheel 128 comprises an eccentric guide 129 configured to retract the followers 106 against the cam 107. The eccentric guide 129 is eccentric with respect to the driveshaft 121.

In the embodiment shown, the eccentric guide 129 is a rail which protrudes from a backing plate 131. However, in alternative embodiments, the eccentric guide 129 may be recessed within the backing plate 131.

In embodiments, the eccentric guide 129 surrounds roller bearings of the followers 106 wherein the cam 107 presses outwardly against the roller bearings to drive the followers 106 outwardly and wherein the eccentric guide 129 pulls the roller bearings inwardly to retract the followers 106.

In embodiment shown, the eccentric guide 129 is circular. However, in an alternative embodiment, the eccentric guide 129 has a profile conforming to the profile of the cam 107 so that the followers 106 closely follow the profile of the cam 107.

The eccentric guide 129 may retract the followers 106 during an induction stroke, thereby negating the need for turbo injection of the intake manifold 123 which may allow for four-stroke cycle operation of the engine 100.

The flywheel 128 may have a counterweight portion 132 to balance the flywheel 128.

Figure 2:
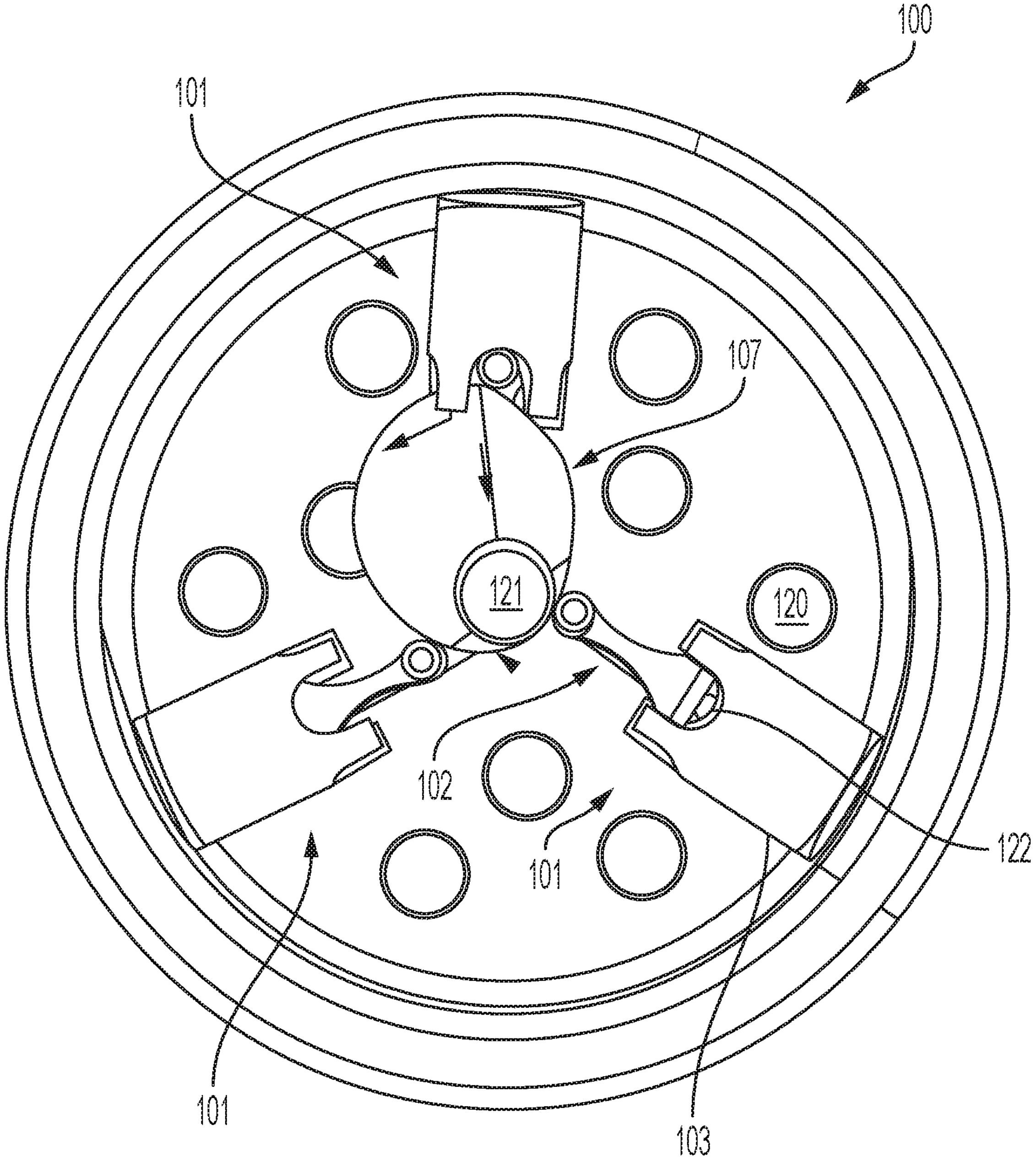
FIG. 2 shows a side view of the radial cam engine in accordance with an embodiment.
Figure 7:
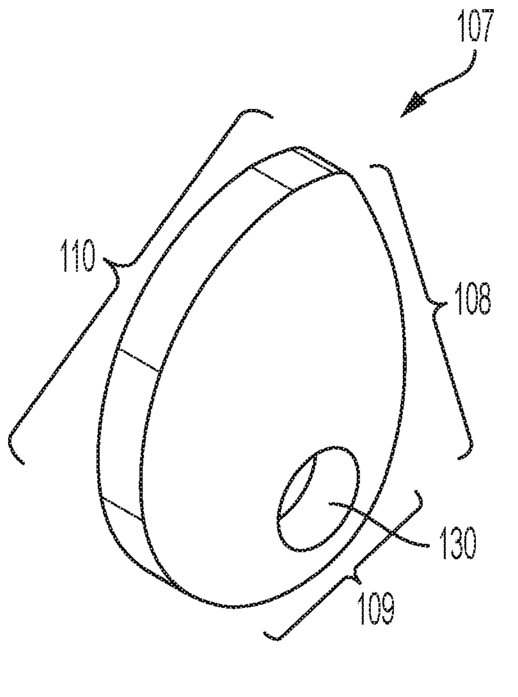
FIG. 7 shows a perspective view of the cam of FIG. 6.

FIGS. 5 and 7 show a cam 107 having a slightly different geometry to that which is shown in FIG. 1, especially with regards to the combustion cam profile 108 which is flatter, which is designed to work with the flywheel 128 for two or four-stroke operation.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A radial cam engine comprising radially arranged piston assemblies, each comprising a piston reciprocating within an internal combustion cylinder and having a guided follower operably interfacing a central cam turning a drive shaft, the cam comprising three distinct cam profiles for compression, combustion and exhaust strokes, wherein the cam has a minimum radius at the exhaust cam profile; wherein the engine comprises a flywheel having an eccentric guide configured to retract the followers and wherein the eccentric guide surrounds roller bearings of the followers.

2. The engine as claimed in claim 1, wherein a radius of the cam is at a maximum between the compression cam profile and the combustion cam profile.

3. The engine as claimed in claim 1, wherein a radius of the exhaust cam profile is at a minimum at a midway point of the exhaust cam profile.

4. The engine as claimed in claim 1, wherein a radius of the compression cam profile is at a maximum at an end of the compression cam profile.

5. The engine as claimed in claim 1, wherein a radius of the compression cam profile is at a minimum at a start of the compression cam profile.

6. The engine as claimed in claim 1, wherein the compression cam profile has a radius which increases linearly with angle.

7. The engine as claimed in claim 1, wherein the combustion cam profile has a start profile shaped to impart a greater force vector component orthogonal to a radius of the cam as compared to at an end profile thereof.

8. The engine as claimed in claim 1, wherein each follower comprises a roller bearing.

9. The engine as claimed in claim 8, wherein each roller bearing is guided within guide rails.

10. The engine as claimed in claim 1, wherein, during the exhaust stroke, each piston moves beyond a side exhaust port of its cylinder.

11. The engine as claimed in claim 10, wherein the side exhaust ports are shaped to define an opening proportionate to piston offset.

12. The engine as claimed in claim 1, wherein each piston assembly is at an angle of approximately 3° with respect to a radius defined by the driveshaft.

13. The engine as claimed in claim 1, further comprising an intake manifold interfacing the piston assemblies and wherein the manifold is turbo injected with compressed air and further comprising valves between respective cylinders and the manifold, wherein the valves close during a compression stroke of their respective piston and opens during an exhaust stroke of their respective piston.

14. The engine as claimed in claim 1, comprising a fuel injector interfacing each cylinder and wherein the fuel injector is timed to inject fuel substantially at a top dead centre piston position.

15. The engine as claimed in claim 1, wherein the engine operates on a dual fuel mixture, wherein the engine comprises dual fuel injectors for each cylinder, and wherein one of the dual fuel injectors are timed differently wherein one fuel injector injects a first type of fuel at the start of its respective compression stroke whereas the other fuel injector injects a second type of fuel towards the end of its respective compression stroke.

16. A radial cam engine comprising radially arranged piston assemblies, each comprising a piston reciprocating within an internal combustion cylinder and having a guided follower operably interfacing a central cam turning a drive shaft, the cam comprising three distinct cam profiles for compression, combustion and exhaust strokes, wherein the cam has a minimum radius at the exhaust cam profile, wherein a radius of the exhaust cam profile is at a minimum at a midway point of the exhaust cam profile.

* * * * *